US011426932B2

United States Patent
Chaffins et al.

(10) Patent No.: US 11,426,932 B2
(45) Date of Patent: Aug. 30, 2022

(54) THREE-DIMENSIONAL PRINTING

(71) Applicant: Hewlett-Packard Development Company, L.P., Spring, TX (US)

(72) Inventors: Sterling Chaffins, Corvallis, OR (US); Anthony P. Holden, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 10 days.

(21) Appl. No.: 17/043,740

(22) PCT Filed: May 15, 2018

(86) PCT No.: PCT/US2018/032767
§ 371 (c)(1),
(2) Date: Sep. 30, 2020

(87) PCT Pub. No.: WO2019/221708
PCT Pub. Date: Nov. 21, 2019

(65) Prior Publication Data
US 2021/0197456 A1  Jul. 1, 2021

(51) Int. Cl.
*B29C 64/165* (2017.01)
*B33Y 10/00* (2015.01)
*B33Y 70/00* (2020.01)
*B29C 64/268* (2017.01)
*B29K 75/00* (2006.01)
*B29K 77/00* (2006.01)
*B29K 105/00* (2006.01)

(52) U.S. Cl.
CPC .......... *B29C 64/165* (2017.08); *B29C 64/268* (2017.08); *B33Y 10/00* (2014.12); *B33Y 70/00* (2014.12); *B29K 2075/00* (2013.01); *B29K 2077/00* (2013.01); *B29K 2105/0044* (2013.01)

(58) Field of Classification Search
CPC ..... B29C 64/165; B29C 64/268; B33Y 10/00; B33Y 70/00; B29K 2077/00
See application file for complete search history.

(56) References Cited

U.S. PATENT DOCUMENTS

| 11,104,065 | B2 * | 8/2021 | Prasad ................ C09D 11/033 |
| 2007/0241482 | A1 | 10/2007 | Giller |
| 2014/0072712 | A1 | 3/2014 | Xu |

(Continued)

FOREIGN PATENT DOCUMENTS

| CN | 107163577 | 9/2017 |
| WO | WO-2017188550 | 11/2017 |

(Continued)

*Primary Examiner* — Timothy Kennedy
*Assistant Examiner* — Farah Taufiq
(74) *Attorney, Agent, or Firm* — Dierker & Kavanaugh PC

(57) ABSTRACT

In an example of a method for reducing oxidation of a build material during three-dimensional printing, a portion of a layer of a polymeric build material is patterned by selectively applying a fusing agent on the portion. A detailing agent selectively applied on a non-patterned portion of the layer. The detailing agent includes a stabilizer to reduce oxidation of the polymeric build material. The layer is exposed to electromagnetic radiation to fuse the portion to form a 3D object layer. The stabilizer at least minimizes discoloration of the non-patterned portion.

12 Claims, 6 Drawing Sheets

(56) References Cited

U.S. PATENT DOCUMENTS

| | | |
|---|---|---|
| 2016/0333955 A1 | 11/2016 | Rowe |
| 2017/0121542 A1 | 5/2017 | Xu et al. |
| 2017/0121547 A1 | 5/2017 | Chopra et al. |
| 2018/0104894 A1 | 4/2018 | Fung et al. |

FOREIGN PATENT DOCUMENTS

| | | | |
|---|---|---|---|
| WO | WO-2017188966 A1 * | 11/2017 | ........... C09D 11/037 |
| WO | WO-2017196328 | 11/2017 | |
| WO | WO-2018022034 A1 | 2/2018 | |

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
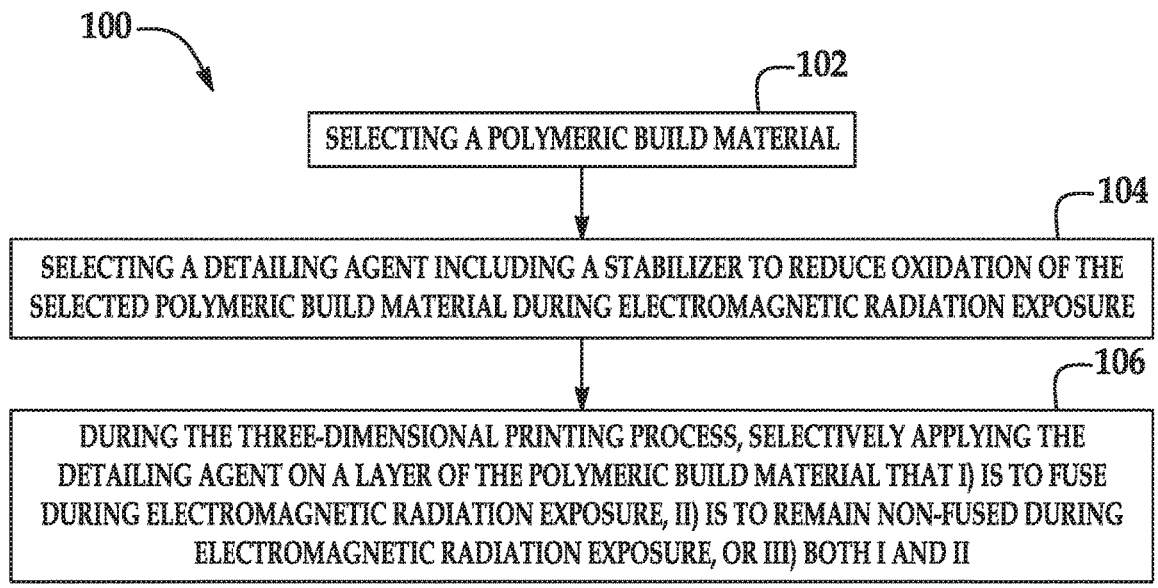
FIG. 1A is a flow diagram illustrating an example of a method disclosed herein.

Some examples of three-dimensional (3D) printing may utilize a fusing agent (including a radiation absorber) to pattern polymeric build material. In these examples, an entire layer of the polymeric build material is exposed to radiation, but the patterned region (which, in some instances, is less than the entire layer) of the polymeric build material is fused/coalesced and hardened to become a layer of a 3D part. In the patterned region, the fusing agent is capable of at least partially penetrating into voids between the polymeric build material particles, and is also capable of spreading onto the exterior surface of the polymeric build material particles. This fusing agent is capable of absorbing radiation and converting the absorbed radiation to thermal energy, which in turn fuses/coalesces the polymeric build material that is in contact with the fusing agent. Fusing/coalescing causes the polymeric build material to join or blend to form a single entity (i.e., the layer of the 3D part). Fusing/coalescing may involve at least partial thermal merging, melting, binding, and/or some other mechanism that coalesces the polymeric build material to form the layer of the 3D part.

In these examples of 3D printing, the entire layer of the polymeric build material may be pre-heated (e.g., to a temperature ranging from about 5° C. to about 50° C. below the melting point of the polymeric build material). Pre-heating the polymeric build material reduces the amount of thermal energy that is sufficient to elevate the polymeric build material above its melting point (as compared to the amount of thermal energy that is sufficient to elevate the polymeric build material that is not pre-heated above its melting point). In other words, pre-heating reduces the amount of radiation (absorbed and converted to thermal energy by the fusing agent) that is sufficient to fuse/coalesce the polymeric build material. As such, pre-heating the polymeric build material may reduce the energy and time involved in the 3D printing process, which may reduce the cost of the process.

Non-patterned and non-fused polymeric build material in layers that have been exposed to the full printing cycle (i.e., patterning and fusing) may be maintained at the pre-heating temperature throughout the 3D printing process due in part, to the pre-heating of subsequently applied build material layers, the exposure to radiation, and/or the transfer of thermal energy from the fused build material. In some instances, the non-patterned (and therefore, non-fused) build material may be maintained at the pre-heating temperature for several hours, and thus this build material may be exposed to high temperatures for a prolonged period. Moreover, the high temperature exposure may take place in an air environment (i.e., an environment containing 20 vol % or more oxygen) or another oxygen-containing environment.

Prolonged exposure to high temperatures in an oxygen-containing environment may result in the thermal degradation of the polymeric build material. Thermal degradation may be due to the oxidation of the build material. For example, exposure to high temperatures in an oxygen-containing environment may result in chain scission at the amide functionality of a polyamide build material. Thermal degradation may cause discoloration (e.g., yellowing) of the polymeric build material and/or may reduce the reusability/recyclability of the polymeric build material.

Examples of the method disclosed herein may reduce oxidation of a polymeric build material, reduce thermal degradation of a polymeric build material, and/or improve the recyclability of a polymeric build material. More specifically, in the examples disclosed herein, a detailing agent is selectively applied at least to the build material that is not going to become part of the 3D object (i.e., that is not patterned with the fusing agent). The detailing agent includes a stabilizer, which evaporates at the coalescence/fusing temperature. The evaporation cools the surface of the polymeric build material. The cooling of the build material reduces the time that the build material is exposed to the coalescence/fusing temperature, which, in turn reduces chain scission. The result is a reduction in the oxidation and/or thermal degradation of the polymeric build material surface throughout the prolonged high temperature exposure during three-dimensional printing.

The detailing agent disclosed herein may also be selectively applied to the build material that is patterned with the fusing agent and that is to become part of the 3D object. Since the detailing agent reduces the oxidation and/or the thermal degradation of the polymeric build material, the 3D object may be mechanically stronger and more aesthetically pleasing when the detailing agent is used in conjunction with the fusing agent. The detailing agent, including the stabilizer, is also evaporated at the elevated 3D printing temperatures, and thus does not remain in the 3D object that is formed.

Figure 1B:
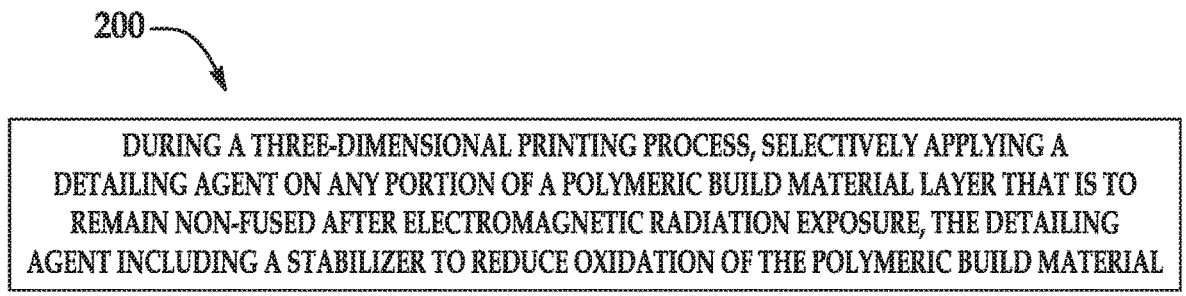
FIG. 1B is a flow diagram illustrating another example of a method disclosed herein.
Figure 1C:
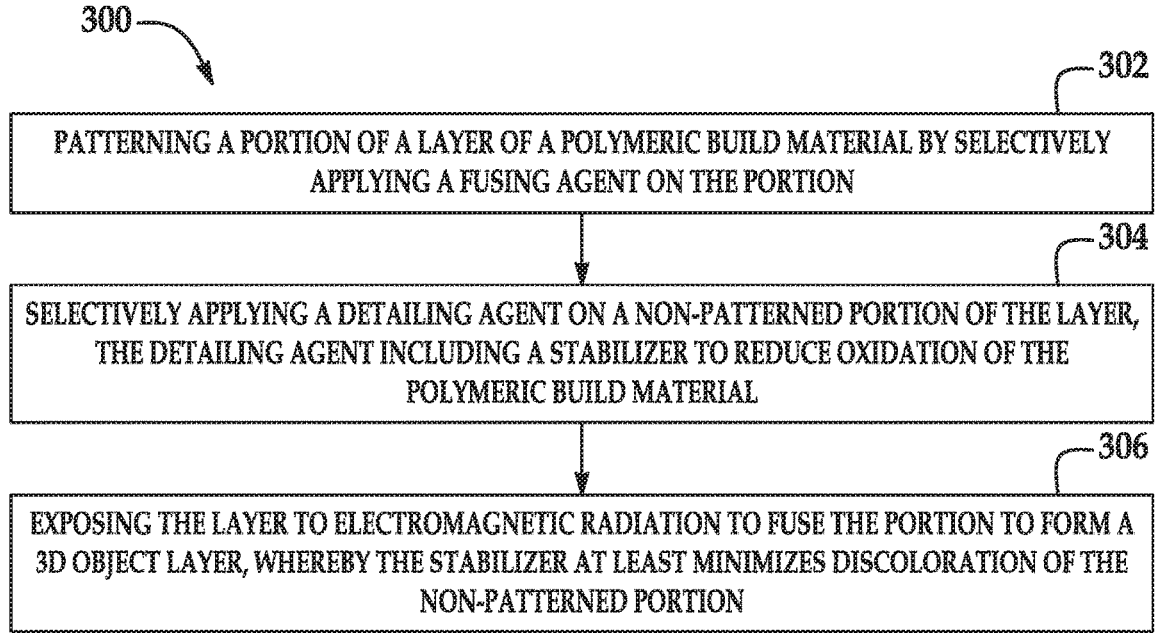
FIG. 1C is a flow diagram illustrating yet another example of a method disclosed herein.

Flow diagrams of examples of the method disclosed herein are shown in FIGS. 1A, 1B, and 1C.

FIG. 1A depicts a method 100 for reducing thermal degradation of a polymeric build material during a three-dimensional (3D) printing process. This example method 100 includes selecting a polymeric build material, as shown at reference numeral 102; selecting a detailing agent including a stabilizer to reduce oxidation of the selected polymeric build material during electromagnetic radiation exposure, as shown at reference numeral 104; and during the three-dimensional printing process, selectively applying the detailing agent on a layer of the polymeric build material that i) is to fuse during electromagnetic radiation exposure, ii) is to remain non-fused during electromagnetic radiation exposure, or iii) both i and ii, as shown at reference numeral 106.

FIG. 1B depicts a method 200 for improving build material recyclability. This example method 200 includes selectively applying, during a three-dimensional printing process, a detailing agent on any portion of a polymeric build material layer that is to remain non-fused after electromagnetic radiation exposure, the detailing agent including a stabilizer to reduce oxidation of the polymeric build material.

FIG. 1C depicts a method 300 for reducing oxidation of a build material during three-dimensional printing. This example method 300 includes patterning a portion of a layer of a polymeric build material by selectively applying a fusing agent on the portion, as shown at reference numeral 302; selectively applying a detailing agent on a non-patterned portion of the layer, the detailing agent including a stabilizer to reduce oxidation of the polymeric build material, as shown at reference numeral 304; and exposing the layer to electromagnetic radiation to fuse the portion to form a 3D object layer, whereby the stabilizer at least minimizes discoloration of the non-patterned portion, as shown at reference numeral 306.

In each of these example methods 100, 200, 300, it is to be understood that the selective application of any liquid is based on a 3D object model of the 3D object being printed.

Each of these example methods 100, 200, 300 involves a polymeric build material, a detailing agent (which includes a stabilizer), and a fusing agent. Examples of each of the polymeric build material, the detailing agent, and the fusing agent that may be used in the methods 100, 200, 300 will now be described.

Polymeric Build Material

Any polymeric build material may be used in the examples methods 100, 200, 300 disclosed herein. Any suitable thermoplastic polymer may be used, such as thermoplastic polyurethanes, polyamides, and polyolefins. Some examples of semi-crystalline polymers suitable for use as the polymeric build material include semi-crystalline thermoplastic materials with a wide processing window (i.e., the temperature range between the melting point and the re-crystallization temperature), e.g., greater than 5° C. Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.) and thermoplastic polyurethanes. Other examples of crystalline or semi-crystalline polymers suitable for use as the build material particles include polyethylene, polypropylene, and polyoxomethylene (i.e., polyacetals). Still other examples of suitable build material particles 16 include polystyrene, polycarbonate, polyester, other engineering plastics, and blends of any two or more of the polymers listed herein.

The polymeric build material may be made up of similarly sized particles or differently sized particles. In an example, the average particle size of the polymeric or polymeric composite build material ranges from about 2 µm to about 200 µm. In another example, the average particle size of the polymeric or polymeric composite build material ranges from about 20 µm to about 90 µm. In still another example, the average particle size of the polymeric or polymeric composite build material is about 60 µm. The term "particle size", as used herein, refers to the diameter of a spherical particle, or the average diameter of a non-spherical particle (i.e., the average of multiple diameters across the particle), or the volume-weighted mean diameter of a particle distribution. As used herein, the term "particles" does not convey a limitation on the shape of the particles. As examples, particles may be spherical beads or irregularly shaped beads of lower aspect ratio. In some examples, the polymeric build material may be in the form of a powder. In other examples, the polymeric or polymeric composite build material may be in the form of a powder-like material, which includes, for example, short fibers having a length that is greater than its width. In some examples, the powder may be formed from, or may include, short fibers that may, for example, have been cut into short lengths from long strands or threads of material.

In some examples, the polymeric build material may be mixed with a whitener, an antistatic agent, a flow aid, or a combination thereof. While several examples of these additives are provided, it is to be understood that these additives are selected to be thermally stable (i.e., will not decompose) at the 3D printing temperatures.

Whitener(s) may be added to the build material to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in an amount ranging from greater than 0 wt % to about 10 wt %, based on the total weight of the build material.

Antistatic agent(s) may be added to the build material to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material.

Flow aid(s) may be added to improve the coating flowability of the polymeric build material. Flow aids may be particularly beneficial when the build material has an average particle size less than 25 µm. The flow aid improves the flowability of the polymeric build material by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material.

Detailing Agent

In the examples of the method 100, 200, 300 disclosed herein, a detailing agent is used, at least on the non-patterned portion(s) of the build material (i.e., the portion(s) not patterned with the fusing agent). As such, the detailing agent does not include any materials that absorb the electromagnetic radiation used during the 3D printing process.

The detailing agent is also selected to include a stabilizer that reduces oxidation and/or thermal degradation of the selected polymeric build material during radiation exposure. As such, the stabilizer used in the detailing agent will depend, in part, upon the polymeric build material being used.

The detailing agent may include the stabilizer and a balance of water. In some examples, the detailing agent consists of these components, without any other components. In other examples, the detailing agent may further include a surfactant to improve the jettability through an inkjet print head and/or the coatability of the detailing agent on the polymeric build material. In still other examples, the detailing agent may further include an antimicrobial agent and/or a chelating agent. In yet further examples, the detailing agent includes the stabilizer, the surfactant(s), the antimicrobial agent(s), the chelating agent(s), and the balance of water.

The stabilizer may be any component that i) reduces the oxidation and/or thermal degradation of the polymeric build material, and ii) is jettable via an inkjet print head. In an example, the stabilizer is a mixture of co-solvents. An example of a suitable stabilizing co-solvent mixture includes triethylene glycol and 2-pyrrolidone (a.k.a. 2-pyrrolidinone). In an example of any of the methods 100, 200, 300, the detailing agent consists of the stabilizer and a balance of water, and the stabilizer consists of triethylene glycol in an amount ranging from about 10 wt % to about 12 wt % of a total weight of the detailing agent and 2-pyrrolidone in an amount ranging from about 4 wt % to about 6 wt % of the total weight of the detailing agent. It has been found that these co-solvents, in the amounts disclosed herein, have an anti-oxidation effect when they evaporate from polymeric build materials, such as thermoplastic urethane, polyamides, and other thermoplastics, during the heating stages of the 3D printing process disclosed herein. In an example of any of the methods 100, 200, 300, the polymeric build material is selected from the group consisting of polyamide and thermoplastic polyurethane; and the stabilizer in the detailing agent includes triethylene glycol in an amount ranging from about 10 wt % to about 12 wt % of a total weight of the detailing agent and 2-pyrrolidone in an amount ranging from about 4 wt % to about 6 wt % of the total weight of the detailing agent.

It has been found that the stabilizer disclosed herein exhibits the anti-oxidation effect at the coalescing/fusing temperatures of the print cycle. When thermal degradation occurs at the highest of the printing temperatures (as opposed to, for example, at the pre-heating temperature), the mechanical properties of the exposed build material may be as deleteriously affected as, or more deleteriously affected than the aesthetic properties. The stabilizer, and thus the detailing agent, disclosed herein exhibits the anti-oxidation effect at the coalescing/fusing temperatures of the print cycle, and thus may be used to improve both aesthetics and mechanical properties of non-patterned build material (thus improving its recyclability) and of patterned build material (that becomes part of the 3D object).

The detailing agent disclosed herein is used to reduce build material oxidation and/or degradation, which reduces discoloration of the build material and thus can also improve the recyclability. As such, the detailing agent disclosed herein does not include a colorant. In these examples, the detailing agent may be colorless. As used herein, "colorless," means that the detailing agent is achromatic and does not include a colorant.

In some examples, the detailing agent includes surfactant(s). Examples of suitable surfactants include water-soluble, non-ionic surfactants (e.g., TERGITOL™ TMN-6, TERGITOL™ 15-S-7 (a secondary alcohol ethoxylate), or TERGITOL™ 15-S-9 (a secondary alcohol ethoxylate) from The Dow Chemical Company, and/or anionic surfactants (e.g., CRODAFOS™ (PEG (3) oleyl mono/di phosphate) from Croda). Other suitable surfactants include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants, such as CAPSTONE® FS-35, from DuPont), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or TEGO® Wet 510 (polyether siloxane) available from Evonik Industries).

Whether a single surfactant is used or a combination of surfactants is used, the total amount of surfactant(s) in the detailing agent may range from about 0.01 wt % to about 5 wt % based on the total weight of the fusing agent. In an example, the total amount of surfactant(s) in the fusing agent may be about 1 wt % based on the total weight of the detailing agent.

The detailing agent may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Other examples include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the detailing agent may include a total amount of antimicrobial agents that ranges from about 0.05 wt % to about 1 wt %. In an example, the antimicrobial agent(s) is/are a biocide(s) and is/are present in the detailing agent in an amount of about 0.25 wt % (based on the total weight of the detailing agent).

In an example, the detailing agent includes a chelating agent. The chelating agent may be selected from the group consisting of methylglycinediacetic acid, trisodium salt; 4,5-dihydroxy-1,3-benzenedisulfonic acid disodium salt monohydrate; ethylenediaminetetraacetic acid (EDTA); and hexamethylenediamine tetra(methylene phosphonic acid), potassium salt; and combinations thereof. Methylglycinediacetic acid, trisodium salt ($Na_3MGDA$) is commercially available as TRILON® M from BASF Corp.

When included, the chelating agent may be present in an amount greater than 0 wt % and less than 1 wt % based on the total weight of the detailing agent.

As mentioned above, the balance of the detailing agent is water. In an example, deionized water is used.

Fusing Agent

In the examples of the method 100, 200, 300 disclosed herein, a fusing agent is used. Some examples of the fusing agent are dispersions including a radiation absorber (i.e., an active material). In an example, the electromagnetic radiation-absorbing active material is selected from the group consisting of an infrared light absorber, a near-infrared light absorber, a plasmonic resonance absorber, and combinations thereof.

In some examples, the active material may be any infrared light absorbing colorant. In an example, the active material is a near-infrared light absorber. Any near-infrared colorants, e.g., those produced by Fabricolor, Eastman Kodak, BASF, or Yamamoto, may be used in the fusing agent. As one example, the fusing agent may be a printing liquid formulation including carbon black as the active material. Examples of this printing liquid formulation are commercially known as CM997A, 516458, C18928, C93848, C93808, or the like, all of which are available from HP Inc.

Other suitable active materials include near-infrared absorbing dyes or plasmonic resonance absorbers.

Some suitable examples of fusing agent include Lumogen® IR 765 and Lumogen® IR 788, commercially available from BASF. The Lumogen® dyes are quaterrylene dyes, which are based on the following chemical backbone:

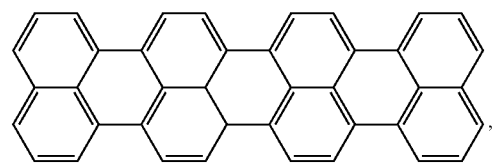 [SMILES: C1=CC2c3ccc4c5cccc6cccc(c7ccc(c3c74)C3=CC=c4c(c1c1cccc7cccc4c71)C32)c65]

which may have pendant groups attached on the ends, and in some instances along the backbone chain.

As another example, the fusing agent may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

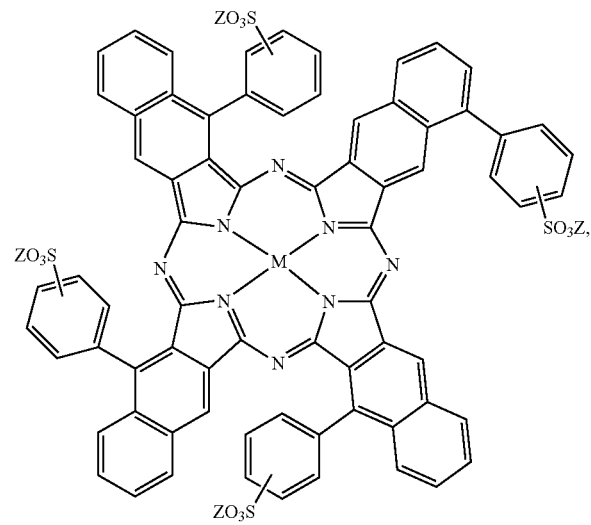

-continued
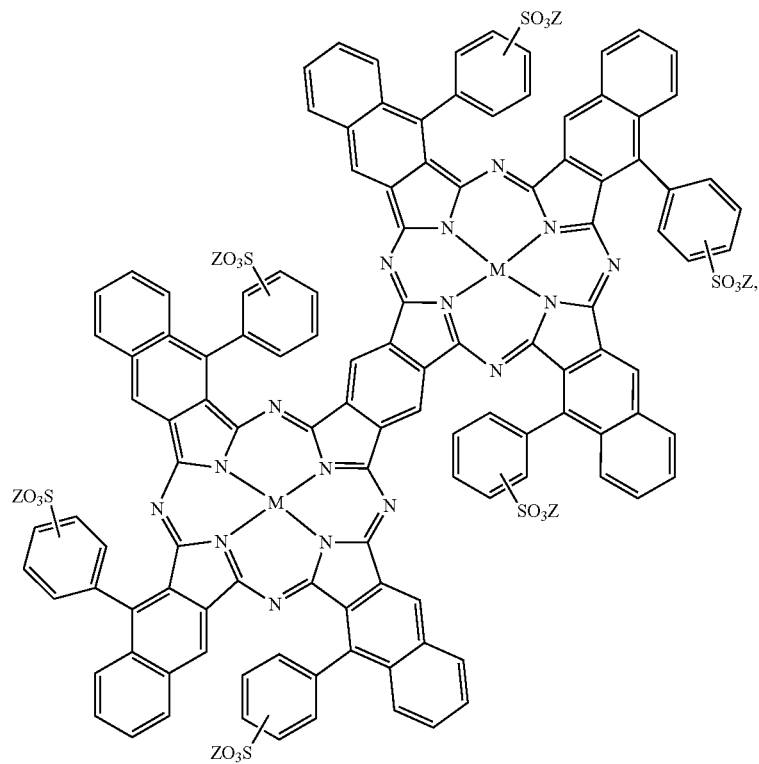
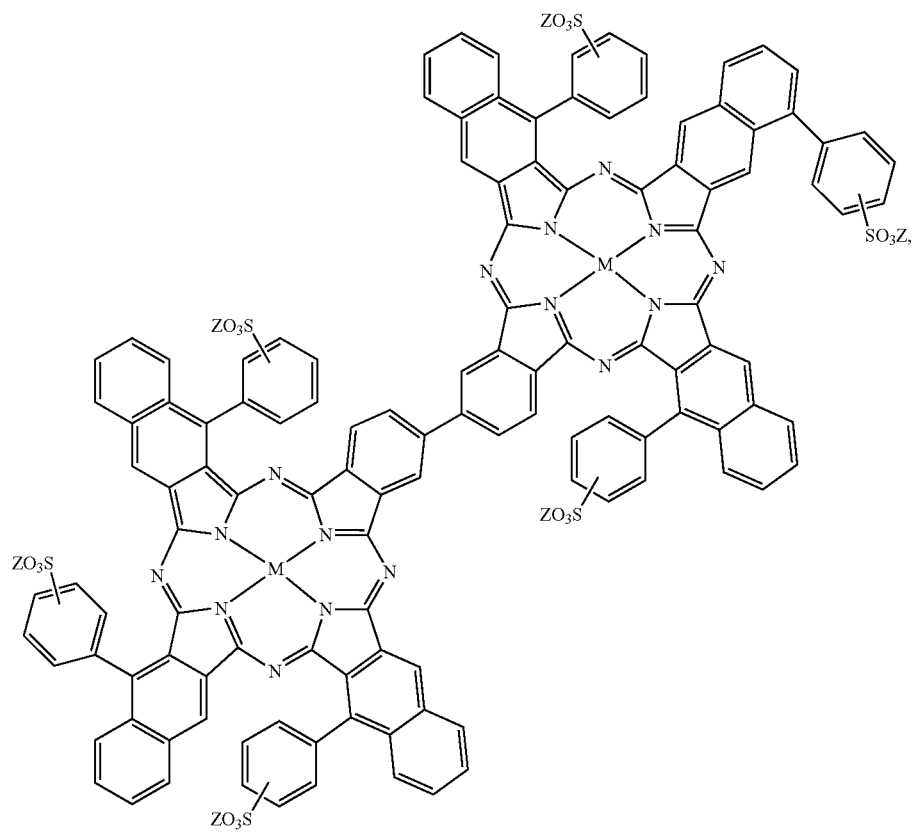

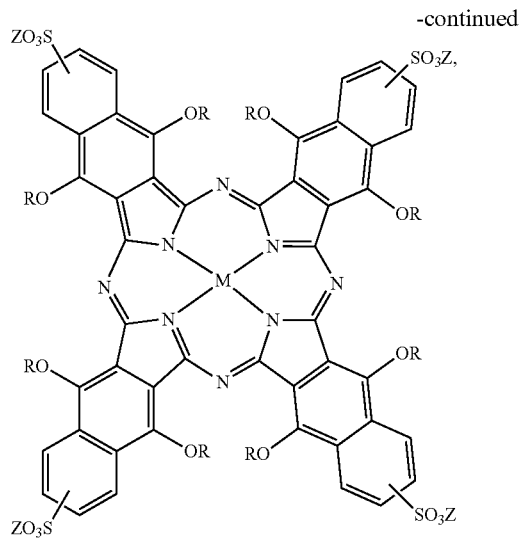

and mixtures thereof. In the above formulations, M can be a divalent metal atom (e.g., copper, etc.) or can have OSO$_3$Na axial groups filling any unfilled valencies if the metal is more than divalent (e.g., indium, etc.), R can be hydrogen or any C$_1$-C$_8$ alkyl group (including substituted alkyl and unsubstituted alkyl), and Z can be a counterion such that the overall charge of the near-infrared absorbing dye is neutral. For example, the counterion can be sodium, lithium, potassium, NH$_4^+$, etc.

Some other examples of the near-infrared absorbing dye are hydrophobic near-infrared absorbing dyes selected from the group consisting of:

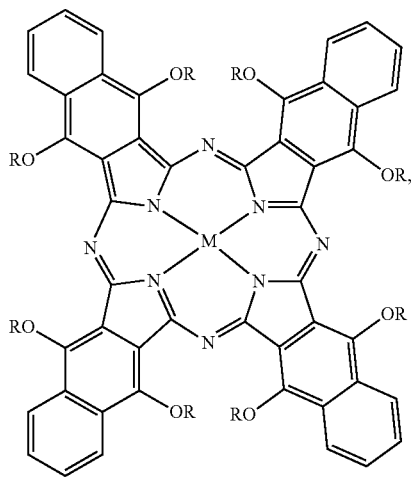

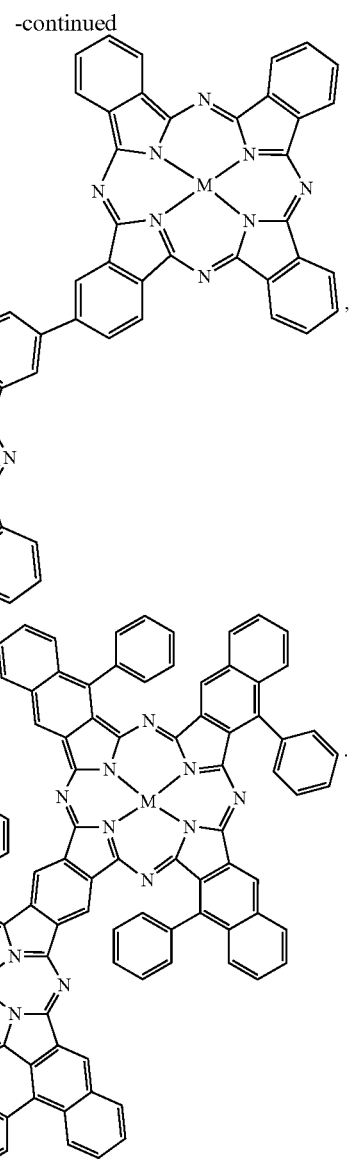

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

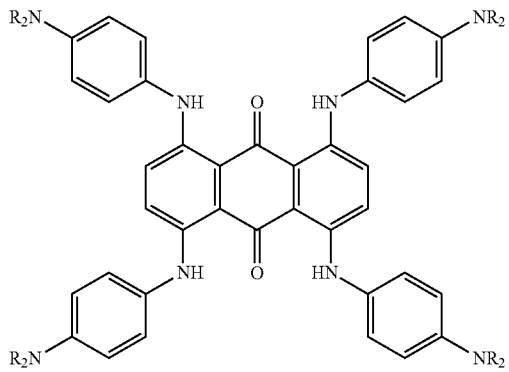

Anthroquinone dyes/pigments

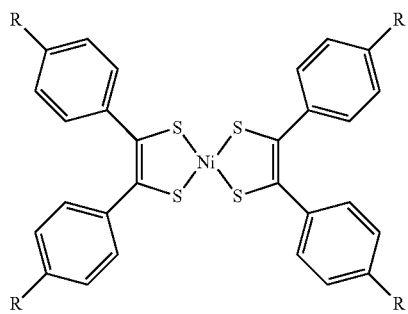

Nickel Dithiolene dyes/pigments where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

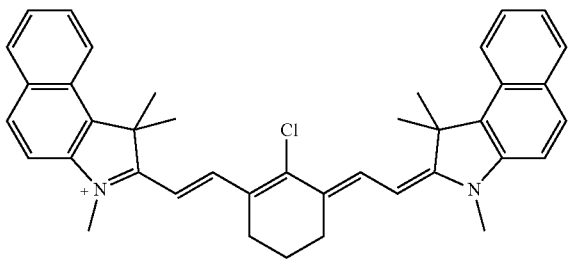

Cyanine dyes/pigments

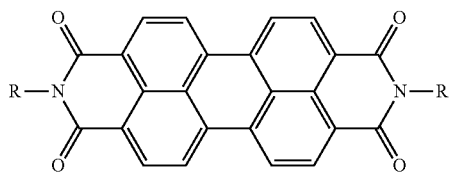

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

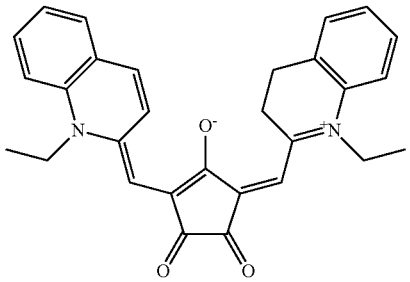

Croconium dyes/pigments

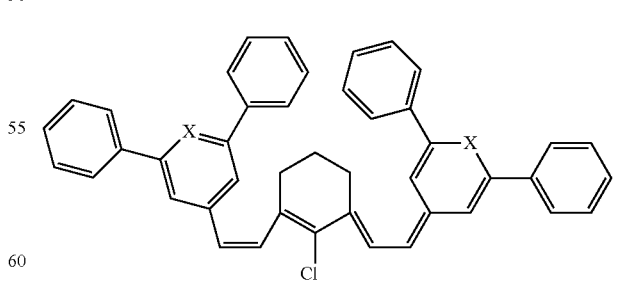

Pyrilium (X = O), thiopyrilium (X = S) dyes/pigments

Boron-dipyrromethene dyes or pigments and aza-boron-dipyrromethene dyes or pigments may have the following structures, respectively:

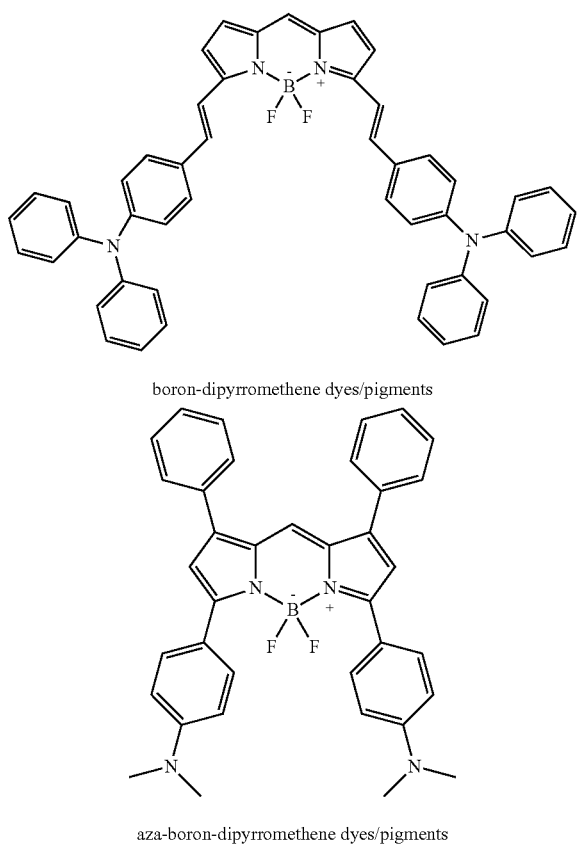

boron-dipyrromethene dyes/pigments aza-boron-dipyrromethene dyes/pigments

In other examples, the active material may be a plasmonic resonance absorber. The plasmonic resonance absorber allows the fusing agent to absorb radiation at wavelengths ranging from 800 nm to 4000 nm (e.g., at least 80% of radiation having wavelengths ranging from 800 nm to 4000 nm is absorbed), which enables the fusing agent to convert enough radiation to thermal energy so that the build material coalesces. The plasmonic resonance absorber also allows the fusing agent to have transparency at wavelengths ranging from 400 nm to 780 nm (e.g., 20% or less of radiation having wavelengths ranging from 400 nm to 780 nm is absorbed), which enables the fusing agent to be lightly colored without the fusing agent deleteriously affecting the color of the printed object.

The absorption of the plasmonic resonance absorber is the result of the plasmonic resonance effects. Electrons associated with the atoms of the plasmonic resonance absorber may be collectively excited by radiation, which results in collective oscillation of the electrons. The wavelengths that can excite and oscillate these electrons collectively are dependent on the number of electrons present in the plasmonic resonance absorber particles, which in turn is dependent on the size of the plasmonic resonance absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the fusing agent to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the active material that is present in the fusing agent ranges from greater than 0 wt % to about 40 wt % based on the total weight of the fusing agent. In other examples, the amount of the active material in the fusing agent ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the fusing agent having jetting reliability and heat and/or radiation absorbance efficiency.

As used herein, "AA vehicle" (fusing/active agent vehicle) may refer to the liquid in which the active material is dispersed or dissolved to form the fusing agent. A wide variety of AA vehicles, including aqueous and non-aqueous vehicles, may be used in the fusing agent. In some examples, the AA vehicle may include water alone or a non-aqueous solvent alone with no other components. In other examples, the AA vehicle may include other components, depending, in part, upon the inkjet printhead that is to be used to dispense the fusing agent. Examples of other suitable active agent components include dispersant(s), silane coupling agent(s), co-solvent(s), surfactant(s), antimicrobial agent(s), anti-kogation agent(s), and/or chelating agent(s).

When the active material is the plasmonic resonance absorber, the plasmonic resonance absorber may, in some instances, be dispersed with a dispersant. As such, the dispersant helps to uniformly distribute the plasmonic resonance absorber throughout the fusing agent. Examples of suitable dispersants include polymer or small molecule dispersants, charged groups attached to the plasmonic resonance absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the fusing agent may range from about 10 wt % to about 200 wt % based on the weight of the plasmonic resonance absorber in the fusing agent.

When the active material is the plasmonic resonance absorber, a silane coupling agent may also be added to the fusing agent to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent may range from about 0.1 wt % to about 50 wt % based on the weight of the plasmonic resonance absorber in the fusing agent. In an example, the total amount of silane coupling agent(s) in the fusing agent ranges from about 1 wt % to about 30 wt % based on the weight of the plasmonic resonance absorber. In another example, the total amount of silane coupling agent(s) in the fusing agent ranges from about 2.5 wt % to about 25 wt % based on the weight of the plasmonic resonance absorber.

The solvent of the fusing agent may be water or a non-aqueous solvent (e.g., ethanol, acetone, n-methyl pyrrolidone, aliphatic hydrocarbons, etc.). In some examples, the fusing agent consists of the active material and the solvent (without other components). In these examples, the solvent makes up the balance of the fusing agent.

Classes of organic co-solvents that may be used in a water-based fusing agent include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (also known as 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the fusing agent in a total amount ranging from about 1 wt % to about 50 wt % based upon the total weight of the fusing agent, depending upon the jetting architecture of the inkjet printhead. In an example, the total amount of the co-solvent(s) present in the fusing agent is 25 wt % based on the total weight of the fusing agent.

The co-solvent(s) of the fusing agent may depend, in part, upon the jetting technology that is to be used to dispense the fusing agent. For example, if thermal inkjet printheads are to be used, water and/or ethanol and/or other longer chain alcohols (e.g., pentanol) may be the solvent (i.e., makes up 35 wt % or more of the fusing agent) or co-solvents. For another example, if piezoelectric inkjet printheads are to be used, water may make up from about 25 wt % to about 30 wt % of the fusing agent, and the solvent (i.e., 35 wt % or more of the fusing agent) may be ethanol, isopropanol, acetone, etc. The co-solvent(s) of the fusing agent may also depend, in part, upon the build material that is being used with the fusing agent. For a hydrophobic build material (e.g., a polyamide), the AA vehicle may include a higher solvent content in order to improve the flow of the fusing agent into the build material layer.

The AA vehicle may also include humectant(s). In an example, the total amount of the humectant(s) present in the fusing agent ranges from about 3 wt % to about 10 wt %, based on the total weight of the fusing agent. An example of a suitable humectant is LIPONIC® EG-1 (also known as LEG-1, glycereth-26, and ethoxylated glycerol, available from Lipo Chemicals).

In some examples, the AA vehicle includes surfactant(s) to improve the jettability of the fusing agent. Examples of suitable surfactants include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants, such as CAPSTONE® FS-35, from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik).

Whether a single surfactant is used or a combination of surfactants is used, the total amount of surfactant(s) in the fusing agent may range from about 0.01 wt % to about 10 wt % based on the total weight of the fusing agent. In an example, the total amount of surfactant(s) in the fusing agent may be about 3 wt % based on the total weight of the fusing agent.

An anti-kogation agent may be included in the fusing agent that is to be jetted when using thermal inkjet printing. Kogation refers to the deposit of dried printing liquid (e.g., fusing agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., less than 5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fusing agent may range from greater than 0.20 wt % to about 0.65 wt % based on the total weight of the fusing agent. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

The AA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the fusing agent may include a total amount of antimicrobial agent(s) that ranges from about 0.05 wt % to about 1 wt %. In an example, the antimicrobial agent(s) is/are a biocide(s) and is/are present in the fusing agent in an amount of about 0.25 wt % (based on the total weight of the fusing agent).

Chelating agents (or sequestering agents) may be included in the AA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent may range from greater than 0 wt % to about 2 wt % based on the total weight of the fusing agent. In an example, the chelating agent(s) is/are present in the fusing agent in an amount of about 0.04 wt % (based on the total weight of the fusing agent).

Printing Methods

The methods 100, 200, 300 disclosed herein utilize a detailing agent to reduce thermal degradation, improve the recyclability, and/or reduce oxidation of the polymeric build material during a 3D printing process. An example of the 3D printing process and each of the methods 100, 200, 300 is shown schematically in FIGS. 2A through 2E.

Prior to execution of any of the methods 100, 200, 300 disclosed herein or as part of the methods 100, 200, 300 a controller 30 (see, e.g., FIG. 4) may access data stored in a data store 32 (see, e.g., FIG. 4) pertaining to a 3D part that is to be printed. The controller 30 may determine the number of layers of the build material 16 that are to be formed and the locations at which the fusing agent 26 from the first applicator 24A is to be deposited on each of the respective layers.

While not shown in FIGS. 2A through 2E, an example of the method 100 includes selecting the polymeric build material and selecting the detailing agent that includes a stabilizer capable of reducing oxidation of the selected polymeric build material during the electromagnetic radiation exposure of the 3D printing process.

Each of the methods 100, 200, 300 may also include applying the build material 16 to form a layer 38. As mentioned above, the build material 16 may additionally include the whitener, the charging agent, the flow aid, or combinations thereof. In the example shown in FIGS. 2A and 2B, a printing system (e.g., the printing system 10 shown in FIG. 4) may be used to apply the build material 16. The printing system 10 may include a build area platform 12, a build material supply 14 containing the build material 16, and a build material distributor 18.

The build area platform 12 receives the build material 16 from the build material supply 14. The build area platform 12 may be moved in the directions as denoted by the arrow 20, e.g., along the z-axis, so that the build material 16 may be delivered to the build area platform 12 or to a previously formed layer 46 (shown in FIG. 2D). In an example, when the build material 16 is to be delivered, the build area platform 12 may be programmed to advance (e.g., downward) enough so that the build material distributor 18 can push the build material 16 onto the build area platform 12 to form a substantially uniform layer 38 of the build material 16 thereon. The build area platform 12 may also be returned to its original position, for example, when a new part is to be built.

The build material supply 14 may be a container, bed, or other surface that is to position the build material 16 between the build material distributor 18 and the build area platform 12.

The build material distributor 18 may be moved in the directions as denoted by the arrow 22, e.g., along the y-axis, over the build material supply 14 and across the build area platform 12 to spread the layer 38 of the build material 16 over the build area platform 12. The build material distributor 18 may also be returned to a position adjacent to the build material supply 14 following the spreading of the build material 16. The build material distributor 18 may be a blade (e.g., a doctor blade), a roller, a combination of a roller and a blade, and/or any other device capable of spreading the build material 16 over the build area platform 12. For instance, the build material distributor 18 may be a counter-rotating roller. In some examples, the build material supply 14 or a portion of the build material supply 14 may translate along with the build material distributor 18 such that build material 16 is delivered continuously to the material distributor 18 rather than being supplied from a single location at the side of the printing system 10 as depicted in FIG. 2A.

Figure 2A:
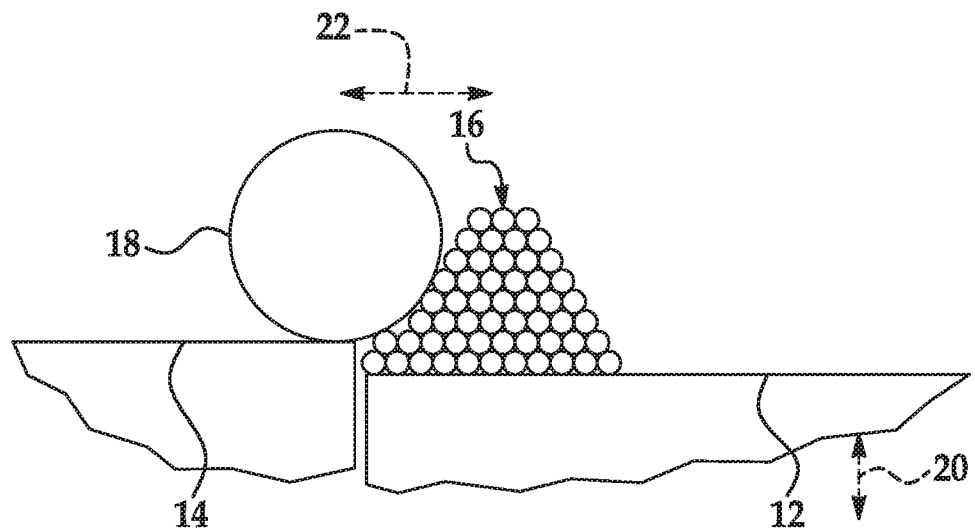
FIGS. 2A through 2E are schematic and partially cross-sectional cutaway views depicting the formation of a 3D part using examples of the method disclosed herein.
Figure 2B:
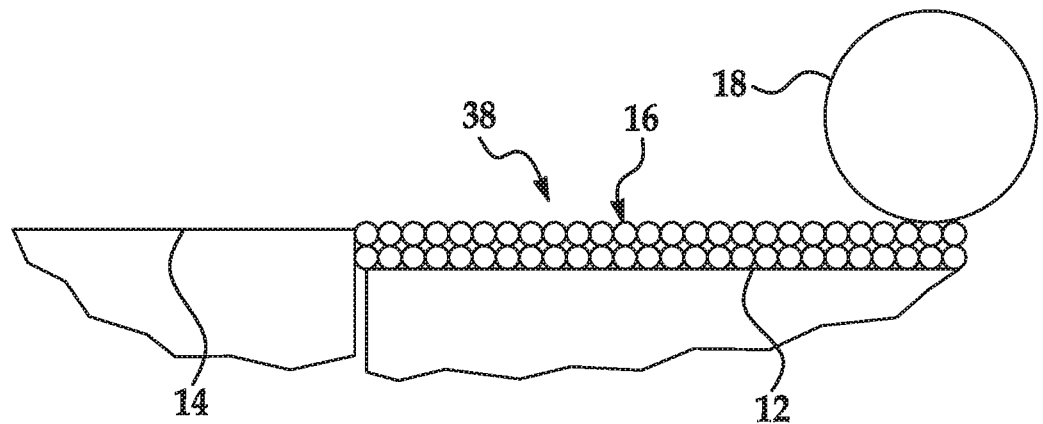

As shown in FIG. 2A, the build material supply 14 may supply the build material 16 into a position so that it is ready to be spread onto the build area platform 12. The build material distributor 18 may spread the supplied build material 16 onto the build area platform 12. The controller 30 may process control build material supply data, and in response, control the build material supply 14 to appropriately position the particles of the build material 16, and may process control spreader data, and in response, control the build material distributor 18 to spread the supplied build material 16 over the build area platform 12 to form the layer 38 of build material 16 thereon. As shown in FIG. 2B, one build material layer 38 has been formed.

The layer 38 of the build material 16 has a substantially uniform thickness across the build area platform 12. In an example, the thickness of the build material layer 38 is about 100 µm. In another example, the thickness of the build material layer 38 ranges from about 30 µm to about 300 µm, although thinner or thicker layers may also be used. For example, the thickness of the build material layer 38 may range from about 20 µm to about 500 µm, or from about 50 µm to about 80 µm. The layer thickness may be about 2× (i.e., 2 times) the build material diameter at a minimum for finer part definition. In some examples, the layer thickness may be about 1.2× the build material diameter.

After the build material 16 has been applied, and prior to further processing, the build material layer 38 may be exposed to heating. Heating may be performed to pre-heat the build material 16, and thus the heating temperature may be below the melting point of the polymeric build material. As such, the temperature selected will depend upon the build material 16 that is used. As examples, the pre-heating temperature may be from about 5° C. to about 50° C. below the melting point of the polymeric build material 16. In an example, the pre-heating temperature ranges from about 50° C. to about 250° C. In another example, the pre-heating temperature ranges from about 150° C. to about 170° C.

Pre-heating the layer 38 of the build material 16 may be accomplished by using any suitable heat source that exposes all of the build material 16 on the build area platform 12 to the heat. Examples of the heat source include a thermal heat source (e.g., a heater (not shown) integrated into the build area platform 12 (which may include sidewalls)) or the radiation source 34, 34' (see, e.g., FIG. 4).

Figure 2C:
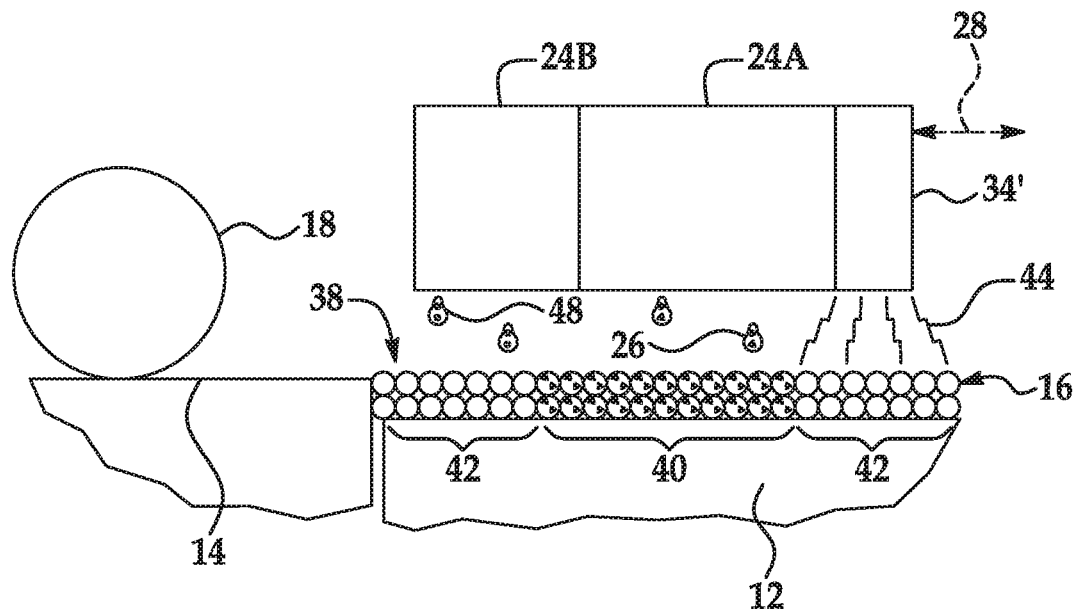

Each example of the method 100, 200, 300 includes selectively applying the detailing agent 48. Any example of the detailing agent 48 described herein may be used in the methods 100, 200, 300. One example of the selective application of the detailing agent 48 is shown in FIG. 2C.

In some examples, the detailing agent 48 is selectively applied on any portion 42 of the polymeric build material layer 38 that is to remain non-fused after electromagnetic radiation exposure. These portion(s) 42 are referred to herein as "non-patterned" portion(s) 42 because they are not patterned with the fusing agent 26 and thus do not fuse/coalesce to become part of the 3D object being formed in the 3D printing process. In these examples, the detailing agent 48 reduces oxidation and/or reduces thermal degradation of the non-patterned build material. The reduction of build material oxidation and/or thermal degradation can reduce or prevent the discoloration of the build material, which can improve the recyclability of the build material. In these examples, the stabilizer (in the detailing agent 48) at least minimizes discoloration of the polymeric build material 16 that remains non-fused after electromagnetic radiation exposure.

After a print cycle, the non-patterned build material remains non-fused, and can be reclaimed and used again. This reclaimed build material is referred to as the recycled build material. The recycled build material may be exposed to 2, 4, 6, 8, 10, or more build cycles (i.e., heating to a temperature ranging from about 155° C. to about 200° C. and then cooling (e.g., passive cooling)), and reclaimed after each cycle. Between cycles, the recycled build material may be mixed with at least some fresh or virgin (i.e., not previously used in a 3D printing process) build material. In some examples, the weight ratio of the recycled build material to the fresh build material may be 80:20, 70:30, 60:40, 50:50, 40:60, 30:70, or 20:80. The weight ratio of the recycled build material to the fresh build material may depend, in part, on the stability of the build material, the discoloration of the recycled build material (as compared to the fresh build material), and the desired aesthetics. In the examples disclosed herein, the reduced discoloration of the recycled build material may allow for more recycled build material and less fresh build material to be used together in subsequent print cycles.

In addition to reducing oxidation and/or thermal degradation of the build material 16, the detailing agent 48 may also provide an evaporative cooling effect to the build material 16 to which it is applied. The cooling effect of the detailing agent 48 reduces the temperature of the build material 16 containing the detailing agent 48 during energy/radiation exposure. As such, in the portion(s) 42, the detailing agent 48 can also help to keep the build material at a temperature below its melting point.

In other examples of the method 100, 200, 300, the detailing agent 48 may be selectively applied on a portion 40 of the polymeric build material layer 38 that is to fuse after electromagnetic radiation exposure. As such, in some examples, the detailing agent 48 is applied (before, after or simultaneously) with the fusing agent 26. When used at the portion(s) 40 in combination with the fusing agent 26, the detailing agent 48, and its ability to reduce oxidation and/or thermal degradation of the build material 16, may strengthen the mechanical stability of the 3D object. In these examples, the detailing agent 48, and its rapid cooling effect, may also be used to obtain different levels of melting/fusing/binding within the layer 46 of the 3D object that is being formed. Different levels of melting/fusing/binding may be desirable to control internal stress distribution, warpage, mechanical strength performance, and/or elongation performance of the final 3D part.

In still other examples, the detailing agent 48 is selectively applied on the portion(s) 42 and the portion 40.

The detailing agent 48 may be dispensed from an applicator 24B (which may be similar to applicator 24A used to dispense the fusing agent 26) and applied to portion(s) 42 of the build material 16. The applicator 24B may be a thermal inkjet printhead, a piezoelectric printhead, a continuous inkjet printhead, etc., and the selective application of the detailing agent 48 may be accomplished by thermal inkjet printing, piezo electric inkjet printing, continuous inkjet printing, etc.

The controller 30 may process data, and in response, control the applicator 24B (e.g., in the directions indicated by the arrow 28) to deposit the detailing agent 48 onto predetermined portion(s) 42 and/or 40 of the build material layer 38. The applicator 24B may be programmed to receive commands from the controller 30 and to deposit the detailing agent 48 according to a pattern of a cross-section for the non-patterned portion 42 and/or for the layer 46 of the 3D object that is to be formed. In this example, the cross-section refers to the cross-section that is parallel to the surface of the build area platform 12.

The volume of the detailing agent 48 that is applied per unit of the build material 16 in the non-patterned portion 40 may be sufficient to provide evaporative cooling for the build material in order to at least substantially reduce oxidation and/or thermal degradation. The volume of the detailing agent 48 that is applied per unit of the build material 16 in the patterned portion 40 may be sufficient to provide evaporative cooling for the build material in order to at least substantially reduce oxidation and/or thermal degradation, but not so much that the cooling deleteriously affects fusing/coalescence of the polymeric build material 16.

Also as shown in FIG. 2C, the methods 100, 200, 300 include selectively applying, based on a 3D object model, the fusing agent 26 on at least a portion 40 of the build material 16. Any example of the fusing agent 26 described herein may be used in the methods 100, 200, 300.

It is to be understood that a single fusing agent 26 may be selectively applied on the portion 40, or multiple fusing agents 26 may be selectively applied on the portion 40. As an example, multiple fusing agents 26 may be used to create a multi-colored part. As another example, one fusing agent 26 may be applied to an interior portion of a layer and/or to interior layer(s) of a 3D part, and a second fusing agent 26 may be applied to the exterior portion(s) of the layer and/or to the exterior layer(s) of the 3D part. In the latter example, the color of the second fusing agent 26 will be exhibited at the exterior of the part.

As illustrated in FIG. 2C, the fusing agent 26 may be dispensed from the applicator 24A. Like applicator 24B, applicator 24A may be a thermal inkjet printhead, a piezo-electric printhead, a continuous inkjet printhead, etc. As such, the selective application of the fusing agent 26 may be accomplished by thermal inkjet printing, piezo electric inkjet printing, continuous inkjet printing, etc.

The controller 30 may process data, and in response, control the applicator 24A (e.g., in the directions indicated by the arrow 28) to deposit the fusing agent 26 onto predetermined portion(s) 40 of the build material layer 38 that are to become part of the 3D part. The applicator 24A may be programmed to receive commands from the controller 30 and to deposit the fusing agent 26 according to a pattern of a cross-section for the layer of the 3D part that is to be formed. In the example shown in FIG. 2C, the applicator 24A selectively applies the fusing agent 26 on those portion(s) 40 of the build material layer 38 that is/are to become the first layer of the 3D part. As an example, if the 3D part that is to be formed is to be shaped like a cube or cylinder, the fusing agent 26 will be deposited in a square pattern or a circular pattern (from a top view), respectively, on at least a portion of the build material layer 38. In the example shown in FIG. 2C, the fusing agent 26 is deposited on the portion 40 of the build material layer 38 and not on the portions 42.

The volume of the fusing agent 26 that is applied per unit of the build material 16 in the patterned portion 40 may be sufficient to absorb and convert enough radiation 44 so that the build material 16 in the patterned portion 40 will fuse/coalesce. The volume of the fusing agent 26 that is applied per unit of the build material 16 may depend, at least in part, on the radiation absorber used, the radiation absorber loading in the fusing agent 26, and the build material 16 used.

Figure 3:
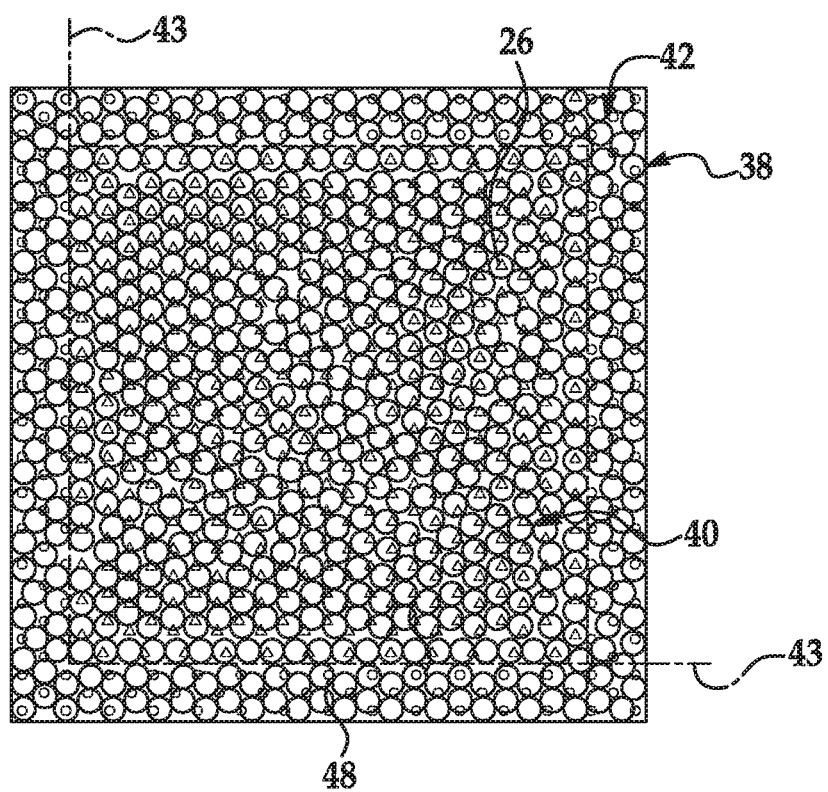
FIG. 3 is a top, schematic view of the build material with a fusing agent applied on a portion thereof and a detailing agent applied on another portion thereof.

Referring now to FIG. 3, a top view of the build material 16 of FIG. 2C on the build area platform 12 is depicted. In the example shown in this figure, the shape of the 3D part layer to be formed is a cube or a rectangular prism, and the pattern of the cross-section that is parallel to the surface of the build area platform 12 is a square or rectangle having an edge boundary 43. In the example shown in FIG. 5, the build material 16 positioned outside of the portion 40 is the build material 16 within the non-patterned portion 42. In the example shown in FIG. 5, the non-patterned portion 42 has the detailing agent 48 applied thereon, but does not have the fusing agent 48 applied thereon.

Figure 2D:
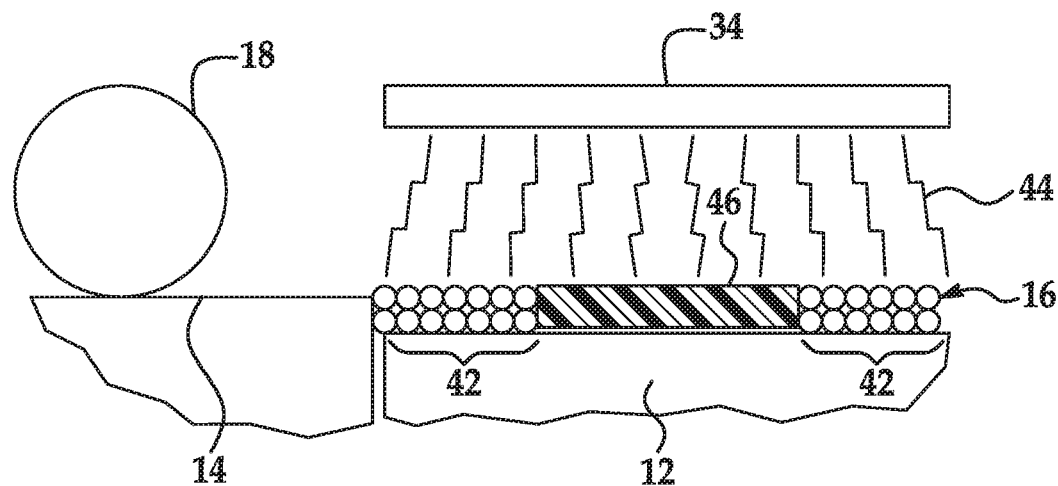

Referring back to FIG. 2C and also to FIG. 2D, the methods 100, 200, 300 may continue by exposing the build material 16 to radiation 44 to fuse/coalesce the at least the portion 40 to form a layer 46 of a 3D part. The radiation 44 may be applied with the source 34 of radiation 44 as shown in FIG. 2D or with the source 34' of radiation 44 as shown in FIG. 2C.

The fusing agent 26 enhances the absorption of the radiation 44, converts the absorbed radiation 44 to thermal energy, and promotes the transfer of the thermal heat to the build material 16 in contact therewith. In an example, the fusing agent 26 sufficiently elevates the temperature of the build material 16 in the layer 38 above the melting point of the polymeric build material 16, allowing fusing/coalescing (e.g., thermal merging, melting, binding, etc.) of the build material 16 to take place. The application of the radiation 44 forms the fused layer 46, shown in FIG. 2D.

It is to be understood that portions 42 of the build material layer 38 that do not have the fusing agent 26 applied thereto do not absorb enough radiation 44 to fuse/coalesce. As such, these portions 42 do not become part of the 3D part that is ultimately formed. The build material 16 in portions 42, which, in some examples have the detailing agent 48 thereon, may be reclaimed to be reused as recycled build material in the printing of another 3D object or in another layer 46 of the 3D object.

In some examples, the 3D printing process (and thus the methods 100, 200, 300) may further comprise repeating the applying of the build material 16, the selectively applying of the detailing agent 48 and the fusing agent 26, and the exposing of the build material 16, wherein the repeating forms the 3D part including the layer 46. In these examples, the processes shown in FIGS. 2A through 2D may be repeated to iteratively build up several fused layers and to form the 3D printed part.

Figure 2E:
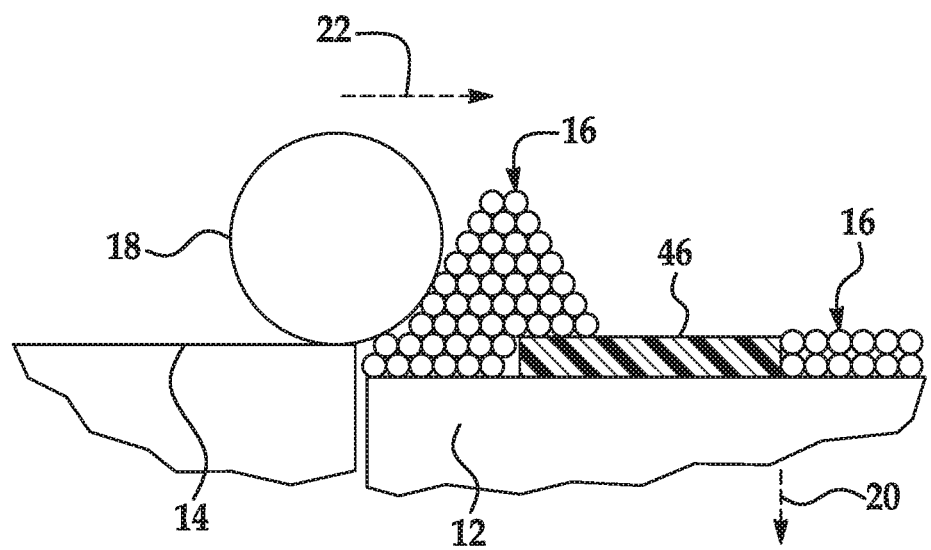

FIG. 2E illustrates the initial formation of a second build material layer on the previously formed layer 46. In FIG. 2E, following the fusing/coalescing of the predetermined portion(s) 40 of the build material 16, the controller 30 may process data, and in response, cause the build area platform 12 to be moved a relatively small distance in the direction denoted by the arrow 20. In other words, the build area platform 12 may be lowered to enable the next build material layer to be formed. For example, the build material platform 12 may be lowered a distance that is equivalent to the height of the build material layer 38. In addition, following the lowering of the build area platform 12, the controller 30 may control the build material supply 14 to supply additional build material 16 (e.g., through operation of an elevator, an auger, or the like) and the build material distributor 18 to form another build material layer on top of the previously formed layer 46 with the additional build material 16. The newly formed build material layer may be in some instances pre-heated, patterned with the fusing agent 26, have the detailing agent 48 applied to portion(s) 42 and/or 40, and then exposed to radiation 44 from the source 34, 34' of radiation 44 to form the additional fused layer.

Since the detailing agent 48 may be applied to the non-patterned portion(s) 42 and/or the patterned portion(s) 40, several variations of the 3D printing process are possible when performing the methods 100, 200, 300. As shown and described in FIGS. 2C and 3, in an example, the 3D printing process of the method 100, 200, or 300 includes patterning the portion 40 of the layer 38 by selectively applying the fusing agent 26 on the portion 40; selectively applying the detailing agent 48 on the non-patterned portion 42 of the layer 38; and exposing the layer 38 to electromagnetic radiation to fuse the portion to form the 3D object layer 46. In another example, the 3D printing process of the method 100, 200, or 300 includes patterning the portion 40 of the layer 38 by selectively applying the fusing agent 26 on the portion 40; selectively applying the detailing agent 48 on the patterned portion 40 of the layer 38; and exposing the layer 38 to electromagnetic radiation to fuse the patterned portion 40 to form the 3D object layer 46. In still another example, the 3D printing process of the method 100, 200, or 300 includes patterning the portion 40 of the layer 38 by selectively applying the fusing agent 26 on the portion 40; selectively applying the detailing agent 48 on the patterned portion 40 and on the non-patterned portion 42 of the layer 38; and exposing the layer 38 to electromagnetic radiation to fuse the portion 40 to form a 3D object layer 46.

Printing System

Figure 4:
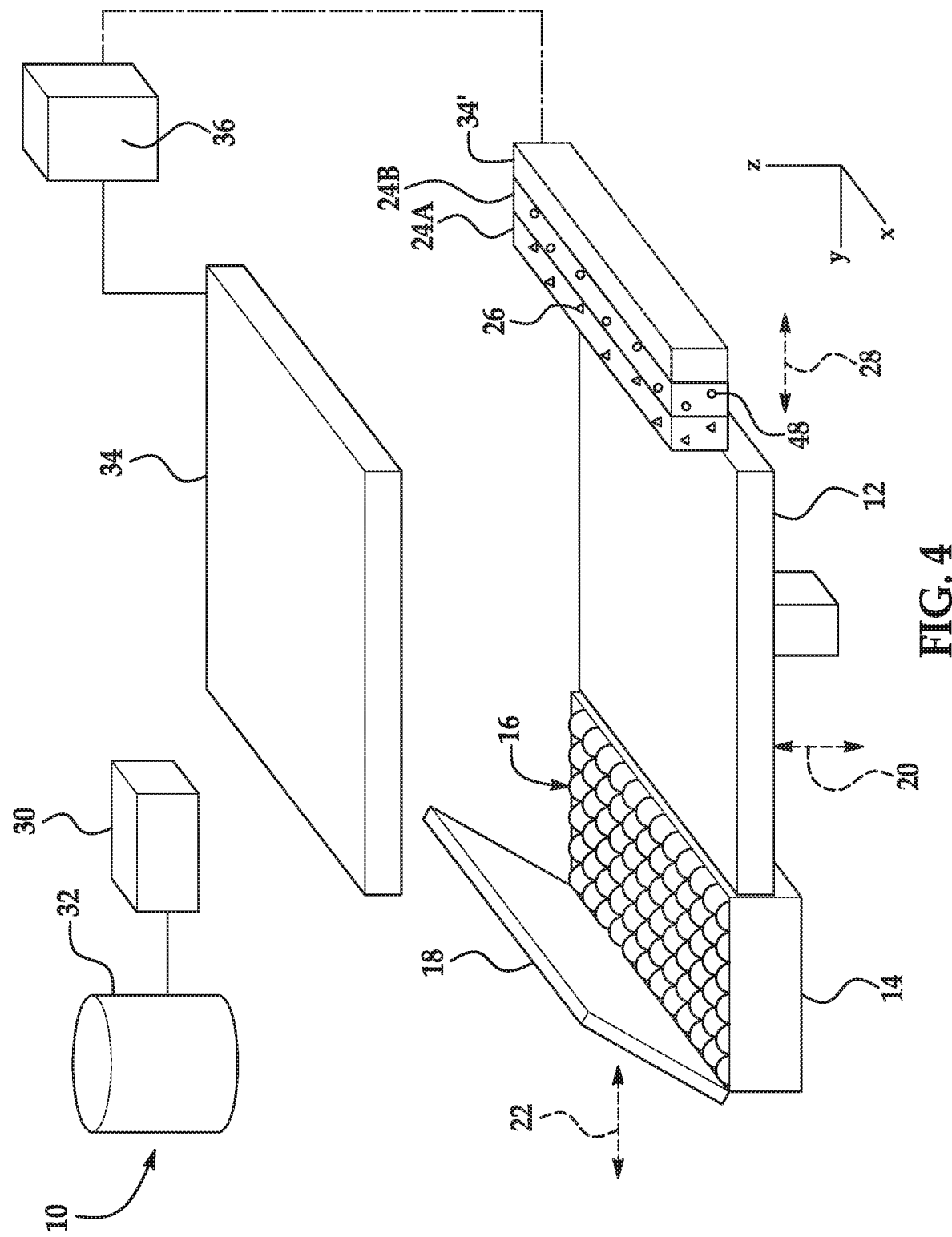
FIG. 4 is a simplified isometric and schematic view of an example of a 3D printing system disclosed herein.

Referring now to FIG. 4, an example of a 3D printing system 10 is schematically depicted. It is to be understood that the 3D printing system 10 may include additional components (some of which are described herein) and that some of the components described herein may be removed and/or modified. Furthermore, components of the 3D printing system 10 depicted in FIG. 4 may not be drawn to scale and thus, the 3D printing system 10 may have a different size and/or configuration other than as shown therein.

In an example, the three-dimensional (3D) printing system 10, comprises: a supply 14 of a build material 16; a build material distributor 18; a supply of a fusing agent 26; an applicator 24A for selectively dispensing the fusing agent 26; an applicator 24B for selectively dispensing the detailing agent 48; a source 34, 34' of radiation 44; a controller 30; and a non-transitory computer readable medium having stored thereon computer executable instructions to cause the controller 30 to: utilize the build material distributor 18 to dispense the build material 16; utilize the applicators 24A, 24B to respectively and selectively dispense the fusing agent 26 and the detailing agent 48 in accordance with the methods 100, 200, 300 disclosed herein; and utilize the source 34, 34' of radiation 44 to expose the build material 16 to radiation 44 to fuse/coalesce the at least the portion 40 of the build material 16. Any example of the build material 16, the fusing agent 26, and the detailing agent 48 may be used in the examples of the system 10.

As shown in FIG. 4, the printing system 10 includes the build area platform 12, the build material supply 14 containing the build material 16, and the build material distributor 18.

As mentioned above, the build area platform 12 receives the build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is one example, and could be replaced with another support member, such as a platen, a fabrication/print bed, a glass plate, or another build surface.

As also mentioned above, the build material supply 14 may be a container, bed, or other surface that is to position the build material 16 between the build material distributor 18 and the build area platform 12. In some examples, the build material supply 14 may include a surface upon which the build material 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material 16 from a storage location to a position to be spread onto the build area platform 12 or onto a previously formed layer 46 of the 3D part.

As also mentioned above, the build material distributor 18 may be a blade (e.g., a doctor blade), a roller, a combination of a roller and a blade, and/or any other device capable of spreading the build material 16 over the build area platform 12 (e.g., a counter-rotating roller).

As shown in FIG. 4, the printing system 10 includes the applicator 24A, which may contain the fusing agent 26, and the applicator 24B, which may contain the detailing agent 48.

The applicators 24A, 24B may be scanned across the build area platform 12 in the directions indicated by the arrow 28, e.g., along the y-axis. The applicator(s) 24A, 24B may be, for instance, a thermal inkjet printhead, a piezoelectric printhead, a continuous inkjet printhead, etc., and may extend a width of the build area platform 12. While the each applicator 24A, 24B is shown in FIG. 4 as a single applicator, it is to be understood that each applicator 24A, 24B may include multiple applicators that span the width of the build area platform 12. Additionally, the applicators 24A, 24B may be positioned in multiple printbars. The applicator(s) 24A, 24B may also be scanned along the x-axis, for instance, in configurations in which the applicator(s) 24A, 24B do/does not span the width of the build area platform 12 to enable the applicator(s) 24A, 24B to deposit the respective agents 26, 48 over a large area of the build material 16. The applicator(s) 24A, 24B may thus be attached to a moving XY stage or a translational carriage (neither of which is shown) that moves the applicator(s) 24A, 24B adjacent to the build area platform 12 in order to deposit the respective agents 26, 48 in predetermined areas of the build material layer 38 that has been formed on the build area platform 12 in accordance with the methods 100, 200, 300 disclosed herein. Each applicator 24A, 24B may include a plurality of nozzles (not shown) through which the respective agents 26, 48 are to be ejected.

The applicator(s) 24A, 24B may deliver drops of the respective agents 26, 48 at a resolution ranging from about 300 dots per inch (DPI) to about 1200 DPI. In other examples, the applicator(s) 24A, 24B may deliver drops of the respective agents 26, 48 at a higher or lower resolution. The drop velocity may range from about 5 m/s to about 24 m/s and the firing frequency may range from about 1 kHz to about 100 kHz. In one example, the volume of each drop may be on the order of about 3 picoliters (pl) to about 18 pl, although it is contemplated that a higher or lower drop volume may be used. In some examples, the applicator(s) 24A, 24B is/are able to deliver variable drop volumes of the respective agents 26, 48. One example of a suitable printhead has 600 DPI resolution and can deliver drop volumes ranging from about 6 pl to about 14 pl.

Each of the previously described physical elements may be operatively connected to a controller 30 of the printing system 10. The controller 30 may process print data that is based on a 3D object model of the 3D object/part to be generated. In response to data processing, the controller 30 may control the operations of the build area platform 12, the build material supply 14, the build material distributor 18, and the applicators 24A, 24B. As an example, the controller 30 may control actuators (not shown) to control various operations of the 3D printing system 10 components. The controller 30 may be a computing device, a semiconductor-based microprocessor, a central processing unit (CPU), an application specific integrated circuit (ASIC), and/or another hardware device. Although not shown, the controller 30 may be connected to the 3D printing system 10 components via communication lines.

The controller 30 manipulates and transforms data, which may be represented as physical (electronic) quantities within the printer's registers and memories, in order to control the physical elements to create the 3D part. As such, the controller 30 is depicted as being in communication with a data store 32. The data store 32 may include data pertaining to a 3D part to be printed by the 3D printing system 10. The data for the selective delivery of the build material 16, the fusing agent 26, the detailing agent 48, etc. may be derived from a model of the 3D part to be formed. For instance, the data may include the locations on each build material layer 38 that the applicator 24A is to deposit the fusing agent 26. In one example, the controller 30 may use the data to control the applicator 24A to selectively apply the fusing agent 26. The data store 32 may also include machine readable instructions (stored on a non-transitory computer readable medium) that are to cause the controller 30 to control the amount of build material 16 that is supplied by the build material supply 14, the movement of the build area platform 12, the movement of the build material distributor 18, the movement of the applicator(s) 24A, 24B, etc.

As shown in FIG. 4, the printing system 10 may also include a source 34, 34' of radiation 44. In some examples, the source 34 of radiation 44 may be in a fixed position with respect to the build material platform 12. The source 34 in the fixed position may be a conductive heater or a radiative heater that is part of the printing system 10. These types of heaters may be placed below the build area platform 12 (e.g., conductive heating from below the platform 12) or may be placed above the build area platform 12 (e.g., radiative heating of the build material layer surface). In other examples, the source 34' of radiation 44 may be positioned to apply radiation 44 to the build material 16 immediately after the fusing agent 26 has been applied thereto. In the example shown in FIG. 4, the source 34' of radiation 44 is attached to the side of the applicators 24A, 24B which allows for patterning and heating/exposing to radiation 44 in a single pass.

The source 34, 34' of radiation 44 may emit radiation 44 having wavelengths ranging from about 100 nm to about 1 mm. As one example, the radiation 44 may range from about 800 nm to about 2 μm. As another example, the radiation 44 may be blackbody radiation with a maximum intensity at a wavelength of about 1100 nm. The source 34, 34' of radiation 44 may be infrared (IR) or near-infrared light sources, such as IR or near-IR curing lamps, IR or near-IR light emitting diodes (LED), or lasers with the desirable IR or near-IR electromagnetic wavelengths.

The source 34, 34' of radiation 44 may be operatively connected to a lamp/laser driver, an input/output temperature controller, and temperature sensors, which are collectively shown as radiation system components 36. The radiation system components 36 may operate together to control the source 34, 34' of radiation 44. The temperature recipe (e.g., radiation exposure rate) may be submitted to the input/output temperature controller. During heating, the temperature sensors may sense the temperature of the build material 16, and the temperature measurements may be transmitted to the input/output temperature controller. For example, a thermometer associated with the heated area can provide temperature feedback. The input/output temperature controller may adjust the source 34, 34' of radiation 44 power set points based on any difference between the recipe and the real-time measurements. These power set points are sent to the lamp/laser drivers, which transmit appropriate lamp/laser voltages to the source 34, 34' of radiation 44. This is one example of the radiation system components 36, and it is to be understood that other radiation source control systems may be used. For example, the controller 30 may be configured to control the source 34, 34' of radiation 44.

To further illustrate the present disclosure, examples are given herein. It is to be understood that these examples are provided for illustrative purposes and are not to be construed as limiting the scope of the present disclosure.

EXAMPLES

Example 1

In this example, thermoplastic polyurethane (from Lubrizol) was used as the polymeric build material. A carbon black based fusing agent was used for samples 1 and 2. The fusing agent contained from about 10 wt % to about 12 wt % of triethylene glycol and from about 4 wt % to about 6 wt % of 2-pyrrolidone. A detailing agent including water, from about 10 wt % to about 12 wt % of triethylene glycol, and from about 4 wt % to about 6 wt % of 2-pyrrolidone was used for sample 2.

The thermoplastic polyurethane was spread into thin layers. For sample 1, one drop of the fusing agent was applied in a single location. For sample 2, twenty drops of the detailing agent was applied on the entire layer, including the spot where the fusing agent was applied. Both samples were heated through to the melting point of the thermoplastic polyurethane to form films. Heating through to the melting point is unlike the 3D printing processes disclosed herein, because in the 3D printing process, the non-patterned build material is not heated to a point where it melts. In this example, both samples 1 and 2 were heated through to the melting point of the thermoplastic polyurethane to observe the impact of the detailing agent on the resulting films.

Figures 5A, 5B:
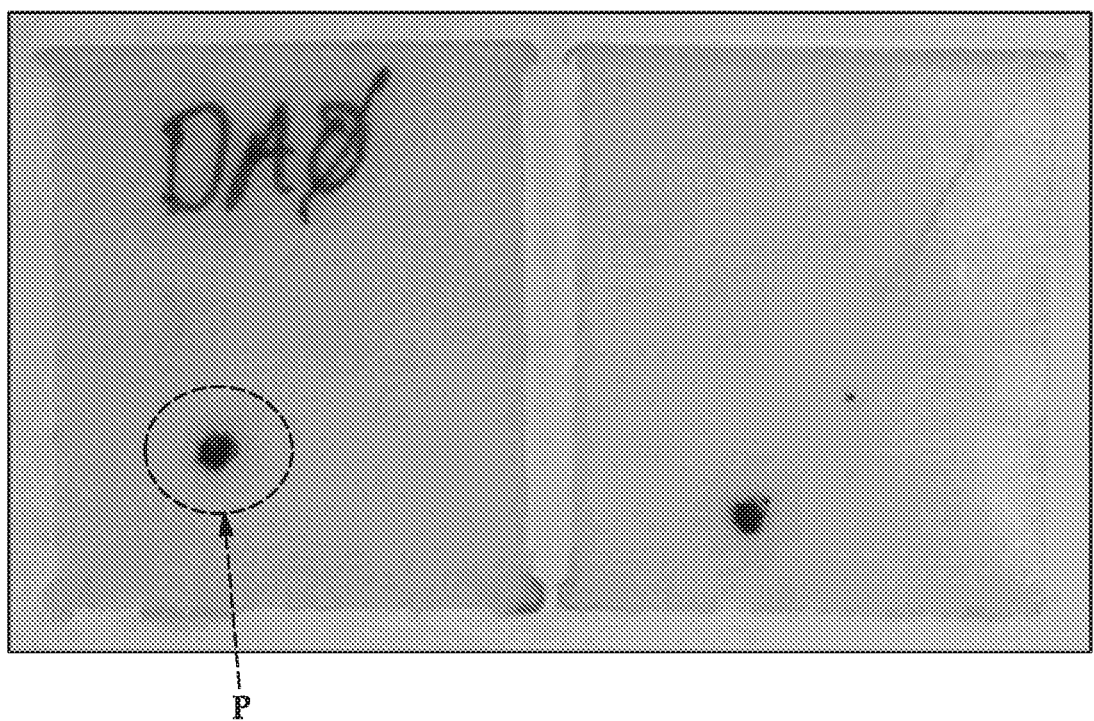
FIGS. 5A and 5B are black and white reproductions of originally colored photographs of films formed with a thermoplastic polyurethane build material and an example of a fusing agent containing a stabilizer deposited at a single location (FIG. 5A) or an example of a detailing agent containing a stabilizer across the entire layer (FIG. 5B)

A photograph of sample 1 is shown in FIG. 5A and a photograph of sample 2 is shown in FIG. 5B. For sample 1, a portion (labeled "P" in FIG. 5A) of the film around where the fusing agent was applied was less discolored than the remainder of the film. This indicated that the stabilizer components of the fusing agent exhibited a halo effect, where the stabilizer components migrated slightly to the surrounding build material, but also reduced the discoloration of that build material. The untreated portion of the build material of sample 1, i.e., the portion without detailing agent and without fusing agent applied thereto, was much more yellow than the portion P. The film of sample 2, where twenty drops of the detailing agent was applied across the entire build material layer, was much less discolored than the non-patterned portion and the portion P of sample 1. This indicated that the detailing agent may significantly reduce the halo effect of the fusing agent, and also the oxidation and/or thermal degradation, and any associated discoloration, of the non-patterned thermoplastic polyurethane.

Example 2

In this example, a polyimide-like material (from BASF Corp.) was used as the polymeric build material. A detailing agent including water, from about 10 wt % to about 12 wt % of triethylene glycol, and from about 4 wt % to about 6 wt % of 2-pyrrolidone was used. A carbon black based fusing agent was also used.

The polyimide-like material was spread into a thin layer. For sample 3, one drop of the fusing agent was applied, and one drop of the detailing agent was applied just below the spot with the fusing agent. Sample 3 was heated through to the melting point of the polyamide-like material to form a film. As noted in Example 1, heating through to the melting point is unlike the 3D printing processes disclosed herein, because in the 3D printing process, the non-patterned build material is not heated to a point where it melts. In this example, sample 3 was heated through to the melting point of the polyimide-like material to observe the impact of the detailing agent on the resulting film.

Figure 6:
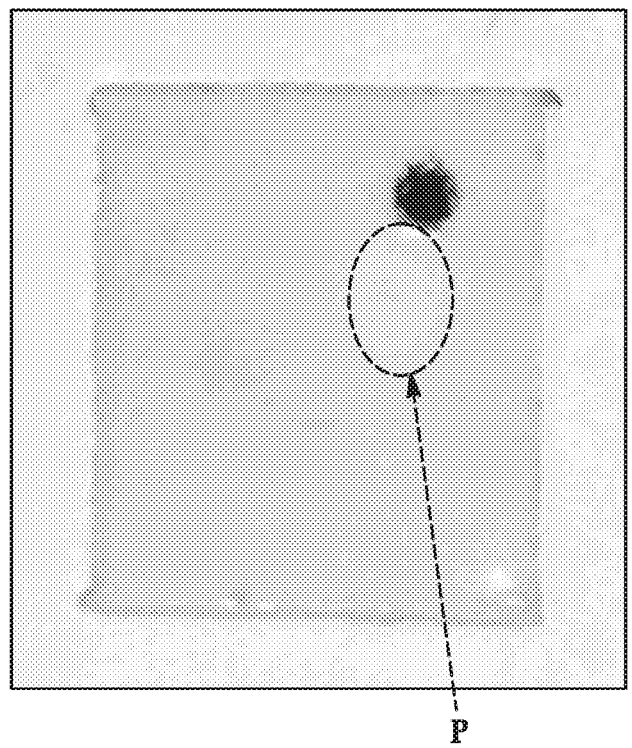
FIG. 6 is a black and white reproduction of an originally colored photograph of a film formed with a polyamide material and an example of a fusing agent and a detailing agent disclosed herein deposited at different locations.

A photograph of sample 3 is shown in FIG. 6. For sample 3, the portion P in FIG. 6 indicates that where one drop of the detailing agent was applied, the melted build material was less discolored than the remainder of the film. This indicated that the detailing agent reduced the discoloration of that build material. The untreated portion of the build material of sample 3, i.e., the portion without detailing agent and without fusing agent applied thereto, was much more yellow/brown than the portion P.

It is to be understood that the ranges provided herein include the stated range and any value or sub-range within the stated range, as if the value(s) or sub-range(s) within the stated range were explicitly recited. For example, from about 10 wt % to about 12 wt % should be interpreted to include not only the explicitly recited limits of from about 10 wt % to about 12 wt %, but also to include individual values, such as about 11° C., about 10.74° C., about 174° C., about 175° C., etc., and sub-ranges, such as from about 166° C. to about 175° C., from about 160.5° C. to about 160.75° C., from about 171° C. to about 176.75° C., etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for reducing oxidation of a build material during three-dimensional printing, the method comprising:
    patterning a portion of a layer of a polymeric build material by selectively applying a fusing agent on the portion;
    selectively applying a detailing agent on a non-patterned portion of the layer, the detailing agent consisting of a stabilizer to reduce oxidation of the polymeric build material and a balance of water, and wherein the stabilizer consists of:
        triethylene glycol in an amount ranging from about 10 wt % to about 12 wt % of a total weight of the detailing agent; and
        2-pyrrolidone in an amount ranging from about 4 wt % to about 6 wt % of the total weight of the detailing agent; and
    exposing the layer to electromagnetic radiation to fuse the portion to form a 3D object layer, whereby the stabilizer at least minimizes discoloration of the non-patterned portion.

2. The method as defined in claim 1, further comprising selectively applying the detailing agent on the portion with the fusing agent.

3. The method as defined in claim 1 wherein the polymeric build material is selected from the group consisting of polyamide and thermoplastic polyurethane.

4. A method for reducing thermal degradation of a polymeric build material during a three-dimensional printing process, the method comprising:
    selecting a polymeric build material;
    selecting a detailing agent consisting of a stabilizer to reduce oxidation of the selected polymeric build material during electromagnetic radiation exposure and a balance of water, and wherein the stabilizer consists of:
        triethylene glycol in an amount ranging from about 10 wt % to about 12 wt % of a total weight of the detailing agent; and
        2-pyrrolidone in an amount ranging from about 4 wt % to about 6 wt % of the total weight of the detailing agent; and
    during the three-dimensional printing process, selectively applying the detailing agent on a layer of the polymeric build material that i) is to fuse during electromagnetic radiation exposure, ii) is to remain non-fused during electromagnetic radiation exposure, or iii) both i and ii.

5. The method as defined in claim 4 wherein the polymeric build material is selected from the group consisting of polyamide and thermoplastic polyurethane.

6. The method as defined in claim 4 wherein the three-dimensional printing process includes:
    patterning a portion of the layer by selectively applying a fusing agent on the portion;
    selectively applying the detailing agent on a non-patterned portion of the layer; and
    exposing the layer to electromagnetic radiation to fuse the portion to form a 3D object layer.

7. The method as defined in claim 4 wherein the three-dimensional printing process includes:
    patterning a portion of the layer by selectively applying a fusing agent on the portion;
    selectively applying the detailing agent on the patterned portion of the layer; and
    exposing the layer to electromagnetic radiation to fuse the patterned portion to form a 3D object layer.

8. The method as defined in claim 4 wherein the three-dimensional printing process includes:
    patterning a portion of the layer by selectively applying a fusing agent on the portion;
    selectively applying the detailing agent on the patterned portion and on a non-patterned portion of the layer; and
    exposing the layer to electromagnetic radiation to fuse the portion to form a 3D object layer.

9. A method for improving build material recyclability, comprising:
    during a three-dimensional printing process, selectively applying a detailing agent on any portion of a polymeric build material layer that is to remain non-fused after electromagnetic radiation exposure, the detailing agent consisting of a stabilizer to reduce oxidation of the polymeric build material and a balance of water, and wherein the stabilizer consists of:

triethylene glycol in an amount ranging from about 10 wt % to about 12 wt % of a total weight of the detailing agent; and 2-pyrrolidone in an amount ranging from about 4 wt % to about 6 wt % of the total weight of the detailing agent.

10. The method as defined in claim 9 wherein the polymeric build material is selected from the group consisting of polyamide and thermoplastic polyurethane.

11. The method as defined in claim 9 wherein the three-dimensional printing process includes:

patterning a portion of the polymeric build material layer by selectively applying a fusing agent on the portion;

selectively applying the detailing agent on a non-patterned portion of the layer; and exposing the layer to electromagnetic radiation to fuse the portion to form a 3D object layer.

12. The method as defined in claim 9 wherein the stabilizer at least minimizes discoloration of the polymeric build material layer that remains non-fused after electromagnetic radiation exposure.

\* \* \* \* \*